(12) United States Patent
Bertouille et al.

(10) Patent No.: US 6,508,265 B1
(45) Date of Patent: Jan. 21, 2003

(54) DUAL FUEL TANK SYSTEM WITH SINGLE FUEL NOZZLE

(75) Inventors: Edward Anthony Bertouille, Dearborn, MI (US); James Michael Cook, Dearborn Heights, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/487,086

(22) Filed: Jan. 19, 2000

(51) Int. Cl.⁷ .................. F02M 37/10; F02M 37/14; B60K 15/06
(52) U.S. Cl. .................. 137/256; 123/509; 123/510; 123/514; 137/265; 137/351; 137/565.33; 137/571; 137/587; 137/1; 141/1; 141/35
(58) Field of Search .................. 137/1, 255, 263, 137/265, 351, 565.3, 565.33, 571, 587, 111, 118.01, 256, 575; 123/509, 510, 514; 280/834; 141/104, 115, 1, 35, 36, 234, 237

(56) References Cited

U.S. PATENT DOCUMENTS

| | | | | |
|---|---|---|---|---|
| 3,254,697 A | * | 6/1966 | Parks | 137/265 |
| 3,677,284 A | * | 7/1972 | Mendez | 137/351 |
| 3,884,255 A | * | 5/1975 | Merkle | 137/265 |
| 3,960,174 A | * | 6/1976 | Latimer et al. | 137/575 |
| 4,178,955 A | * | 12/1979 | Dau | 137/265 |
| 4,188,969 A | * | 2/1980 | Lotton et al. | 137/265 |
| 4,217,922 A | * | 8/1980 | Come | 137/265 |
| 4,852,892 A | * | 8/1989 | Reid | 280/834 |
| 4,930,537 A | * | 6/1990 | Farmer | 137/265 |
| 4,932,609 A | * | 6/1990 | Secchiaroli et al. | 137/571 |
| 5,020,566 A | * | 6/1991 | Shoop | 137/265 |
| 5,197,443 A | * | 3/1993 | Hodgkins | 123/514 |
| 5,360,034 A | * | 11/1994 | Manuelian | 137/571 |
| 5,417,239 A | * | 5/1995 | Ford | 137/571 |
| 5,704,387 A | * | 1/1998 | Sims | 137/263 |
| 5,738,380 A | * | 4/1998 | Zipser et al. | 280/834 |
| 5,983,932 A | * | 11/1999 | Wagner et al. | 137/587 |
| 2001/0335215 | * | 11/2001 | Tipton et al. | 137/571 |

FOREIGN PATENT DOCUMENTS

CA 624469 * 7/1961 .................. 137/265

\* cited by examiner

Primary Examiner—George L. Walton

(57) ABSTRACT

A dual fuel tank (10) including first fuel tank (12) and a second fuel tank (14). A single fuel hose (16) allows fuel to enter the first fuel tank (12) from an outside source. When the fuel level in the first fuel tank (12) reaches an overflow level (17), fuel passes through a transfer tube (18) from the first fuel tank (12) into the second fuel tank (14). A transfer fuel pump (20) communicates fuel from the second fuel tank (14) to the first fuel tank (16) such that the level of fuel in the first tank (12) is maximized relative to the available fuel in the system. A main fuel pump (22) communicates fuel from the first fuel pump (12) to a remote target (24). In this way the fuel is available from a single location within the dual fuel tank (10) at a wider range of angles of vehicle travel.

11 Claims, 1 Drawing Sheet

DUAL FUEL TANK SYSTEM WITH SINGLE FUEL NOZZLE

TECHNICAL FIELD

The present invention relates generally to improvements in automotive dual fuel tank systems and more particularly to improvements in automotive fuel tank systems with multiple fuel tanks and a single fuel fill nozzle.

BACKGROUND ART

Automotive fuel tank systems are well known in the automotive industry. The design of fuel tank systems is often a balance of the cost, weight, complexity, and safety of such designs with the convenience and satisfaction they provide to the customer. One such area of customer convenience and satisfaction is in the area of fuel tank volume.

Increasing the fuel tank volume can lead to increased consumer convenience and satisfaction by providing a greater vehicle range and longer periods of time before requiring a fill-up. This can be additionally important to consumers in automobiles such as sport utility vehicles, where a faster consumption of fuel can shorten vehicle range and time between fill-ups. However, the convenience and satisfaction provided by larger fuel tank volume must be balanced with vehicle weight, safety, cost, and impact on other systems within the automobile.

It is known that the fuel tank volume can be increased through the use of dual fuel tanks. Dual fuel tanks can be used to increase fuel volume while reducing the impact on other automotive systems when compared to a single large tank. It is known, however, that some existing designs for dual fuel tanks can have disadvantages.

One known disadvantage is that dual fuel tanks can require separate fill hoses for each fuel tank. This is highly undesirable since the need to fill separate tanks can lead to customer dissatisfaction. It is known that the use of a single fill hose is more desirable since it improves customer convenience.

Another disadvantage is that fuel can be supplied to the automobile from either or both tanks. One known method utilizes a change-over valve, such that when fuel in one tank is diminished, the valve can switch the source to the other tank. This design can lead to high production and warranty costs, as well as lowered customer dissatisfaction due to malfunctioning valves. A cheaper and more simplistic design for distributing fuel would be highly desirable.

A known method uses a tube to equalize the levels in each tank. Although this method reduces the cost and complexity of design, it has disadvantages as well. This system relies on gravity to supply fuel to the lowest point in the fuel tanks where the fuel is pumped out. This system, however, can function improperly when the vehicle is on an incline that prevents fuel flow to the lowest portion of the fuel system. In addition, the tube that provides a connection between the two fuel tanks must be located near the bottom of each fuel tank for the fuel to be properly distributed. This can create dangerous structural and safety problems. This design places the tube close to the bottom of the vehicle where it may be exposed to damage from collision or foreign objects. A fuel fill system that retains the simplicity of known gravity tube distribution systems, but that worked at a greater range of vehicle angles and reduced the chance of structural damage to the fuel transfer system, would be highly desirable.

Although dual fuel tanks can increase the volume of fuel available to the automobile, they also can increase the weight of the vehicle which is undesirable. It is known that fuel tanks can be created out of plastic to provide a cheaper and lighter alternative to steel tanks. In addition, it is known that the use of low permeability material can reduce fuel hydrocarbon emissions and thereby meet government emission standards. Although fuel tanks made out of plastic materials can be cheaper, lighter and reduce emissions, they also have size limitations. Fuel tanks positioned forward of the rear axle of a vehicle are limited in capacity by the available packaging space. Plastic fuel tanks positioned aft of the rear axle of a vehicle must be protected from hot exhaust gases, exhaust pipe rupture, foreign objects, collision, broken shocks, and other damaging events. Protecting plastic fuel tanks positioned aft of the rear axle from these events can be costly. The smaller the plastic fuel tank behind the rear axle, however, the easier and less expensive it is to protect it from these events. It would be highly desirable to have a fuel tank design that would utilize the cost and weight savings of plastic fuel tanks while reducing the safety costs and concerns limiting present plastic fuel systems.

SUMMARY OF THE INVENTION

It is therefore an object of the present invention to provide a dual fuel tank that maximizes fuel volume while providing adequate fuel supply at a greater range of vehicle angles. It is a further object of the present invention to provide a dual fuel tank that reduces the costs associated with known designs and increases customer convenience.

In accordance with the object of this invention a dual fuel tank system is provided. The dual fuel tank system includes a first fuel tank and a second fuel tank. The dual fuel tank also includes a transfer tube that is in fluid connection with both fuel tanks. The transfer tube allows overflow from the first fuel tank to enter the second fuel tank such that both tanks can be filled from a single fill hose in fluid connection with the first fuel tank.

A transfer fuel pump moves fuel from the second fuel tank into the first fuel tank. In this manner, the volume of fuel in the first fuel tank is kept at a maximum level. By keeping the volume of fuel in the first fuel tank at a maximum and only allowing overflow fuel to transfer from the first fuel tank into the second fuel tank, an adequate supply of fuel is available in the fist fuel tank at a wider range of vehicle angles. A main fuel pump communicates fuel from the first fuel pump to a remote target within the automobile.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
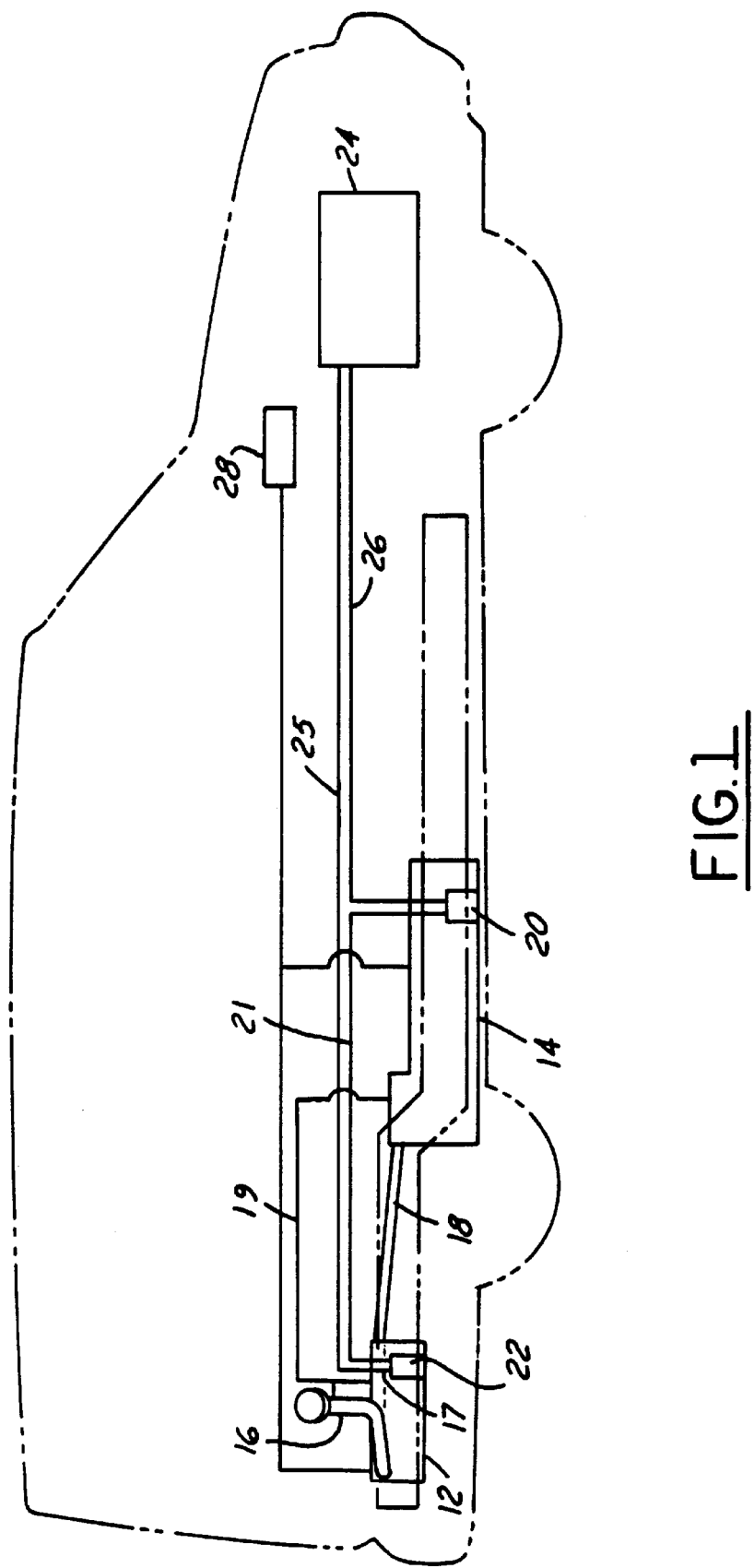
FIG. 1 is an illustration of an embodiment of a dual fuel tank in accordance with the present invention.

Referring now to FIG. 1, which is an illustration of an embodiment of a dual fuel tank 10 in accordance with the present invention. Although the present dual fuel tank 10 is intended for use in automotive applications, the dual fuel tank 10 is capable of being used in a variety of other vehicles and applications.

The dual fuel tank 10 is comprised of a first fuel tank 12 and a second fuel tank 14 positioned within an automobile 15. Although the first fuel tank 12 is shown aft of the second fuel tank 14, it should be understood that the tanks and their appropriate connections could be switched, or moved into different locations entirely. A single fill hose 16 is in fluid connection with the first fuel tank 12 to allow fuel to enter the first fuel tank 12 from an outside source.

When fuel enters the first fuel tank 12 from the single fill hose 16, the first fuel tank 12 fills with fuel. When the fuel level reaches the overflow level 17, the fuel enters a transfer tube 18. The transfer tube 18 is in fluid connection with the first fuel tank 12 and the second fuel tank 14 such that overflow from the first fuel tank 12 can pass into the second fuel tank 14. A fill vent 19 can be used to equalize pressure in both tanks as they are filled. In this fashion, both the first fuel tank 12 and the second fuel tank 14 can be filled from the single fill hose 16. In addition, by positioning the transfer tube 18 in a position to transfer the overflow fuel, the transfer tube 18 is located near the top of both the first fuel tank 12 and the second fuel tank 14. This position increase the safety and durability of the dual tank system 10 by placing the transfer tube 18 in a position where damage from foreign objects or collision is minimized.

Fuel from the second fuel tank 14 is communicated to the first fuel tank 12 through the use of a transfer fuel pump 20. The transfer fuel pump 20 transfers fuel from the second fuel tank 14 to the first fuel tank 12 through a fuel transfer line 21. Although the transfer fuel pump 20 is positioned within the second fuel tank 14, it should be understood that the transfer fuel pump 20 may be positioned outside the second fuel tank 14 such as for diesel applications. By transferring the fuel from the second fuel tank 14 back to the first fuel tank 12, the first fuel tank 12 is kept as close to the overflow level 17 as possible relative to the total fuel available. When taken in combination with the placement of the transfer tube 18 at the overflow level of the first fuel tank, the available amount of fuel in the first fuel tank 12 is maximized at all angles of vehicle travel. In addition, the fuel can be taken from the first fuel tank 12 alone without the need for costly valve switches.

A main fuel pump 22 communicates fuel from the first fuel tank 12 to a remote target 24 through a fuel supply line 25. Although the main fuel pump 22 is positioned within the first fuel tank 12, it should be understood that the main fuel pump 22 may be positioned outside the first fuel tank 12 such as for diesel applications. The remote target 24 is preferably an automotive engine although a variety of fuel destinations are possible. When fuel is returned from the engine, it can pass through a fuel return line 26 into the second fuel tank 14.

The first fuel tank 12 and the second fuel tank 14 and connected to a vapor canister 28. The vapor canister allows the pressure to be equalized in both tanks while preventing undesirable hydrocarbons from the fuel from escaping into the atmosphere. Although a vapor canister 28 is described, other techniques for reducing airborne hydrocarbons can be utilized.

In addition to utilizing techniques to reduce airborne hydrocarbons, the fuel hydrocarbon emissions may be further reduced through the use of low permeability materials. Although a variety of materials may be used, materials such as low permeability plastics can be used to form the first fuel tank 12 as well as the second fuel tank 14 in order to help meet governmental emission standards. The known effects of the volume limitations of plastic tanks for safety and packaging issues when used in positions in-front and behind the rear axle of an automobile can be minimized through the use of this design.

The controlled flow of fuel in the disclosed dual fuel tank 10 allows a dual fuel tank to be created using a second fuel tank 14 located in front of the rear axle of an automobile and a first fuel tank 12 located behind the rear axle. The present design allows for a reduced size for the first fuel tank 12 while maintaining an acceptable overall fuel volume. This reduces the costs associated with additional safety elements such as heat shields when placing plastic fuel tanks aft of the rear axle of an automobile. In addition, a reduction in size of the first fuel tank 12 can allow addition packaging space for other automotive systems allowing for additional customer desires such as a full sized spare tire.

Therefore a dual fuel tank is provided using low permeable plastic for weight, cost and emissions savings and utilizing a single fuel fill hose 16 for customer convenience. The dual fuel tank 10 provides fuel to an automotive system at greater angles of vehicle positioning and without the need for change over valves to switch between fuel tanks.

While particular embodiments of the invention have been shown and described, numerous variations and alternate embodiments will occur to those skilled in the art. Accordingly, it is intended that the invention be limited only in terms of the appended claims.

What is claimed is:

1. A dual fuel tank system for use in a vehicle comprising:
   a first fuel tank;
   a second fuel tank;
   a transfer tube in fluid connection with said first fuel tank and said second fuel tank, said transfer tube allowing fuel to overflow from the top of said first fuel tank into said second fuel tank;
   a fuel transfer line in fluid connection with said first fuel tank and said second fuel tank;
   a transfer fuel pump for communicating fuel during operation of the vehicle from said second fuel tank to said first fuel tank through said fuel transfer line, said transfer fuel pump communicating fuel such that said first tank is not depleted until said second tank is empty;
   a main fuel pump for communicating fuel from said first fuel tank to a remote target;
   a single fill hose in fluid connection with said first fuel tank; and
   a fuel vent in communication with said first fuel tank and said second fuel tank.

2. A dual fuel tank system as described in claim 1, wherein said fist fuel tank is comprised of a low permeability material.

3. A dual fuel tank system as described in claim 1, wherein said second fuel tank is comprised of a low permeability material.

4. A dual fuel tank system as described in claim 1, wherein said first fuel tank is comprised of a plastic material.

5. A dual fuel tank system as described in claim 1, wherein said second fuel tank is comprised of a plastic material.

6. A dual fuel tank system as described in claim 1, wherein said first fuel tank is positioned behind the rear axle of an automobile.

7. A dual fuel tank system as described in claim 1, wherein said first fuel tank is positioned in front of the rear axle of an automobile.

8. A dual fuel tank system as described in claim 1, wherein said second fuel tank is positioned behind the rear axle of an automobile.

9. A dual fuel tank system as described in claim 1, wherein said second fuel tank is positioned in front of the rear axle of an automobile.

10. A method of transferring fuel in a dual tank system for use in a vehicle comprising:
    filling a first tank using a single fill hose;
    filling a second fuel tank by allowing fuel to overflow from the top of said first tank into said second tank;
    withdrawing fuel from said first tank; and
    pumping fuel during operation of the vehicle from said second tank into said first tank through a fuel transfer line, such that the fuel in said first tank is not depleted until said second tank is empty.

11. A method as described in claim 10 further comprising:
    equalizing the pressure in said first and said second tanks through the use of a fill vent.

\* \* \* \* \*